3,450,724
BIS(PERFLUOROALKYL)METHYLENE STEROIDS
Eugene A. La Lancette, Lansdowne, Pa., assignor to E. I. du Pont de Nemours and Company, Wilmington, Del., a corporation of Delaware
No Drawing. Filed Nov. 23, 1966, Ser. No. 596,444
Int. Cl. C07c 169/10, 169/18
U.S. Cl. 260—397.3
9 Claims

ABSTRACT OF THE DISCLOSURE

The di(perfluoroalkyl)methylene steroids of general formulas (I)

(II)

and (III)

wherein

R is H or $CH_3$; $R^1$ and $R^2$ are $C_1$–$C_6$ perfluoroalkyl; Y is =O, $$\overset{OH}{\underset{-H}{|}}$$

or $$\overset{O-CO-R^3}{\underset{-H}{|}}$$

$R^3$ is $C_1$–$C_7$ alkyl; and a and b are single or double bonds, but are not both double bonds. The di(perfluoroalkyl)methylene steroids of this invention possess a variety of useful pharmaceutical properties.

This invention relates to novel fluorine-containing steroids. The novel steroid of this invention contains bis(perfluoroalkyl)methylene groups in either the 2 and 16 position or in both the 2 and 16 positions.

SUMMARY AND DETAILS OF THE INVENTION

These new steroids are selected from the group consisting of

I

II and

III wherein R is methyl or hydrogen; $R^1$ and $R^2$ are alike or different and are lower perfluoroalkyl of up to 6 carbon atoms; Y is =O, $$\overset{OH}{\underset{-H}{|}} \quad \text{or} \quad \overset{O\text{-lower alkanoyl}}{\underset{-H}{|}}$$

containing up to 8 carbons; and a and b, between carbons 4 and 5, and 5 and 6 respectively, each is a single or double bond with the proviso that when either is a double bond the other bond is a single bond.

Lower alkanoyl is the acyl radical of a lower alkanoic acid, for example formic, acetic, propionic, butyric, isobutyric, valeric, caproic, isocaproic, 2-ethylhexanoic and octanoic acid.

These novel steroids are prepared by dehydrating a hydroxybis(perfluoroalkyl)methyl steroid of the formulae

IV

V and

VI wherein R, $R^1$, $R^2$, Y, a and b are as defined above. This dehydration reaction is represented by the following equation, in which, for simplicity, only the A ring is shown.

A similar reaction takes place in the 16 position of the D ring when that carbon atom bears a hydroxybis(perfluoromethylalkyl)methyl substituent of either α or β configuration. The dehydration reaction is conducted by treating a solution of the hydroxybis(perfluoroalkyl)methyl keto steroid of the Formulae IV, V and VI with one of the reactants commonly used in steroid chemistry to dehydrate tertiary alcohols. Such dehydrating agents include thionyl chloride, thionyl bromide, acetic anhydride, acetyl chloride, phosphoric acid, oxalic acid and the like. Thionyl chloride and acetic anhydride are preferred dehydrating agents with thionyl chloride being most preferred. The dehydration agent is normally used in an amount excess relative to the steroid alcohol, for example, in a mole ratio between 3:1 and 15:1.

A tertiary amine is used in the dehydration reaction as a reaction medium and an acid acceptor. Included among the tertiary amines which can be used are heterocyclic amines, such as pyridine, α-methylpyridine, α-ethylpyridine, N-methylpiperidine, and ethylpyrrolidine, quinoline and the like, or a lower trialkylamine such as triethylamine or tributylamine. Pyridine is the preferred reaction medium. The tertiary amine used should be substantially anhydrous and used in an amount in excess of the dehydrating agent.

The dehydration reaction is carried out at low to moderate temperatures in the range between —30 to +50° C. The reaction product can be isolated by any suitable procedure, for example, by pouring the reaction mixture in water and collecting the precipitate by filtration or alternatively by evaporating the volatile components and extracting the residue with an organic solvent.

The steroids defined in Formula I, II and III can be prepared in one step by the dehydration reaction described above or they can be prepared by further conversion of a bis(perfluoroalkyl)methylene steroid employing conventional methods.

These conversion methods consist in converting the initially-obtained bis(perfluoroalkyl)methylene steroid to another steroid, for example by acylation of a hydroxy group or hydrolysis of an acyloxy group.

Hydroxybis(perfluoroalkyl)methyl keto steroids used as the starting materials in the preparation of the products of this invention are prepared by the reaction of a perfluoroketone, $R^1COR^2$, wherein $R^1$ and $R^2$ are lower perfluoroalkyl with a ketosteroid (VII) of the formula

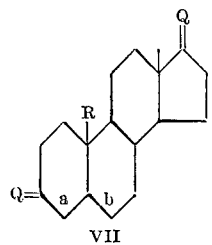

VII having a keto group at either the 3- or 17-positions or a diketosteroid having keto groups at the 3- and 17-position, in which R, a and b are as defined above and Q is =O or O—lower alkanoyl
|
--H containing up to 8 carbons; with the proviso that at least one Q is =O.

In the reaction of the perfluoroketone with the precursor steroid, the perfluoroketone adds to an unsubstituted carbon adjacent to the keto bearing steroid carbon forming a hydroxybis(perfluoroalkyl)methyl group on this adjacent carbon. In the A ring, the reaction occurs only at the 2-position and the resulting substituent has the α configuration. In the D ring, addition takes place only at the 16 carbon and the spatial configuration of the resulting group can be either α or β.

Preparation of hydroxybis(perfluoroalkyl)methyl steroids is accomplished by heating the reactants in a molar ratio of about 1:1 to 2:1 or higher at a temperature in the range of 50–250° C., preferably between 75 and 200° C. in an inert solvent such as benzene, toluene, hexane, tetrahydrofuran and the like. The fluoroketone is used in a molar ratio relative to the steroid reactant between 1:1 and 10:1. Pressure is not critical however atmospheric pressure can be used, but with the more volatile perfluoroketones it is preferable to operate in sealed vessels under autogeneous pressures.

The A ring of these steroids is more reactive than the D ring; therefore it is possible with proper control of the reaction conditions to produce the product substituted on the 2-carbon even when the steroid reactant is a 3,17-diketo steroid. When selective substitution in the A ring is desirable in the case of a 3,17-diketosteroid, a stoichiometric amount of the perfluoroketone is used. Alternatively, a 3,17-diketosteroid can be selectively substituted in the A ring by operating at relatively low temperatures, that is 75–100° C. In some cases a combination of the two methods can be used to selectively substitute the A ring.

For the above reasons, selective introduction of a hydroxybis(perfluoroalkyl) group at the 16-position occurs only when the A ring lacks a keto group.

The introduction at the 16-position of the hydroxybis(perfluoroalkyl)methyl group having the α configuration into 17-ketosteroids is conveniently accomplished at lower temperatures, that is in the vicinity of 100° C. The thermodynamically less stable 16 α substituent is produced at these lower temperatures. At higher temperatures, that is about 200° C., the 16-hydroxybis(perfluoroalkyl)methyl substituent produced has the β configuration.

Examples A–K described in detail the preparation of a number of hydroxybis(perfluoroalkyl)methyl substituted steroids suitable as starting materials in the preparation of the bis(perfluoroalkyl)methylene steroids of this invention. In these examples, the perfluoroketone reactant is hexafluoroacetone, but it will be understood that any other ketone of the formula $R^1COR^2$, where $R^1$ and $R^2$ are lower perfluoroalkyl groups, can be substituted for hexafluoroacetone in the described processes. Examples of other suitable perfluoroketones are perfluoro-2-butanone, perfluoro-2-pentanone, perfluoro-3-pentanone, perfluoro-2-hexanone, perfluoro-2,4-dimethyl-3-pentanone, perfluoro-3-heptanone, perfluoro-2-octanone, perfluoro-5-nonanone, perfluoro-6-undecanone, and perfluoro-7-tridecanone.

EXAMPLE A

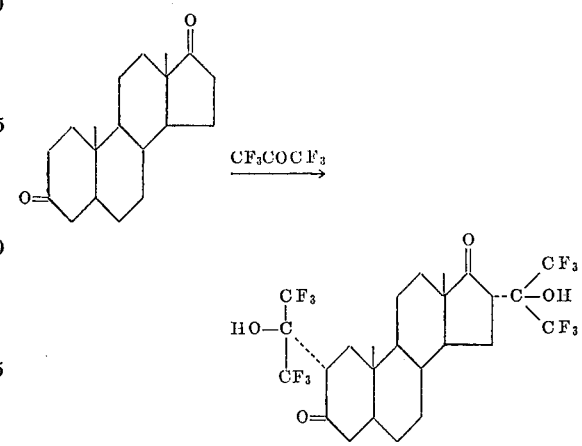

A sealed glass tube containing 5 g. (17.4 mmoles) of 5α-androstane-3,17-dione, 10 ml. (95 mmoles) of hexafluoroacetone and 35 ml. of dry benzene was heated at 100° C. for 84 hours. The reaction mixture was then evaporated to dryness under reduced pressure and the residue was crystallized from benzene/hexane. Two crops of needles were thus obtained: (1) 6.129 g., M.P. 172–

173.5° C. and (2) 0.801 g., M.P. 183–196° C. The first crop consisted of 2α,16α-bis(hexafluoro - 2 - hydroxyisopropyl)-5α-androstane-3,17-dione. An analytical sample obtained by recrystallization from benzene/hexane showed M.P. 179–180° C. and $[\alpha]_D^{23}$ +61° (c. 2.07), $CHCl_3$).

*Analysis.*—Calcd. for $C_{25}H_{28}F_{12}O_4$ (percent): C, 48.39; H, 4.55; F, 36.75. Found (percent): C, 48.85; H, 4.46; F, 36.55.

The infrared, ultraviolet, $^1H$ and $^{19}F$ n.m.r. spectra supported the assigned structure.

Crop (2) consisted of a 1:2 mixture of the 16α and 16β isomers. The 16β isomer can be prepared in the pure state by refluxing a solution of 5 g. of the 16α isomer in 200 ml. of 0.5 N potassium hydroxide in methanol for 132 hours. Suitable working-up of the product gives the 16β isomer as crystals melting at 205–207° C., $[\alpha]_D^{24}$ +44° (c. 1.15, $CHCl_3$).

EXAMPLE B

Applying the procedure of Example A to 4-androstene-3,17-dione (5 g.) gave a product which was crystallized from benzene/hexane to give as the first crop 6.555 g. of 2α,16α - bis(hexafluoro-2-hydroxyisopropyl)-4-androstene-3,17-dione, M.P. 181–184° C. An analytical sample recrystallized from hexane had M.P. 189.5–191.5° C. and $[\alpha]_D^{24}$ +132° (c. 2.0, $CHCl_3$). Elemental and spectral analyses confirmed the structure.

The 16β isomer, M.P. 200–201° C. and $[\alpha]_D^{24}$ +113° (c. 0.53, $CHCl_3$) was obtained by refluxing the 16α isomer with 0.5 N potassium hydroxide in methanol for 40 hours.

EXAMPLE C

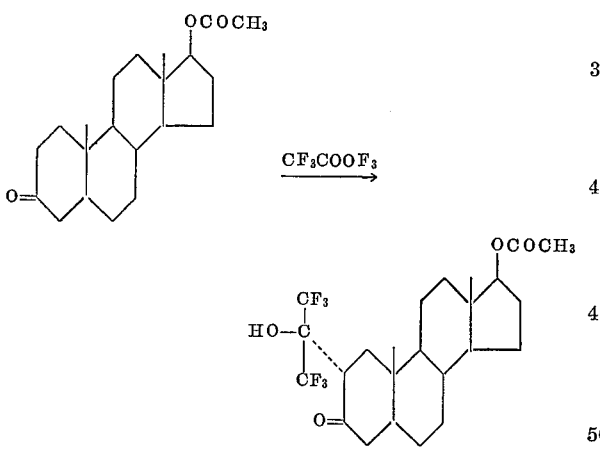

A sealed glass tube containing 10.025 g. (30 mmoles) of 17β-acetoxy-5α-androstane-3-one, 15 ml. (0.14 mole) of hexafluoroacetone and 75 ml. of benzene was heated at 100° C. for 88 hours. The reaction mixture was evaporated to dryness under reduced pressure and the residual solid was crystallized from hexane to give in two crops (11.8642 g. M.P. 161–162.5° C. and 1.1171 g., M.P. 156–159° C.) a total of 2.9813 g. of 2α-(hexafluoro-2-hydroxyisopropyl)-17β-acetoxy-5α-androstane-3-one. The first crop was recrystallized from hexane to give a product of M.P. 161.5–162.5° C. and $[\alpha]_D^{24}$ +17° (c. 1.82, $CHCl_3$).

*Analysis.*—Calcd. for $C_{24}H_{32}F_6O_4$ (percent): C, 57.82; H, 6.47; F, 22.99. Found (percent): C, 57.76; H, 6.67; F, 23.12.

The infrared, ultraviolet, $^1H$ and $^{19}F$ n.m.r. spectra were consistent with the assigned structure.

EXAMPLE D

2α - (hexafluoro - 2-hydroxyisopropyl)-17β-acetoxy-4-androstene-3-one was prepared by the procedure described in Example C from 5 g. of testosterone acetate. After crystallization from hexane, the product had M.P. 141.5–144.5° C. and $[\alpha]_D^{24}$ +76° (c. 1.58, $CHCl_3$).

*Analysis.*—Calcd. for $C_{24}H_{30}F_6O_4$ (percent): C, 58.06; H, 6.09; F, 22.96. Found (percent): C, 58.30; H, 6.30; F, 23.00.

The infrared, ultraviolet, $^1H$ and $^{19}F$ n.m.r. spectra confirmed the structure.

EXAMPLE E

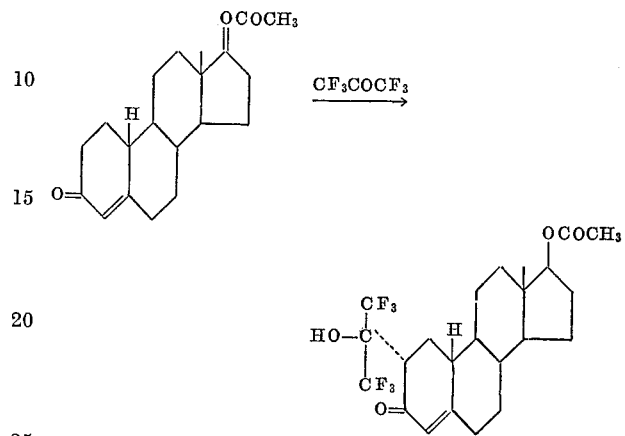

A sealed glass tube containing 15 g. (47.3 mmoles) of 17β-acetoxy-4-estrene-3-one, 25 ml. of hexafluoroacetone and 105 ml. of benzene was heated at 100° C. for 65 hours. The reaction mixture was taken to dryness to give an oil which crystallized upon trituration with hexane. There was obtained by filtration and further concentration of the mother liquor 19.634 g. of a mixture of the desired product with a smaller amount of an unidentified fluoroalcohol. The less soluble 2α-(hexafluoro-2-hydroxyisopropyl)-17β-acetoxy-4-estrene-3-one was isolated by fractional crystallization from hexane/acetone as needles, M.P. 190–191° C., $[\alpha]_D^{23}$ −165° (c. 1.18, $CHCl_3$).

*Analysis.*—Calcd. for $C_{23}H_{28}F_6O_4$ (percent): C, 57.25; H, 5.85; F, 23.63. Found (percent): C, 57.46; H, 5.97; F, 23.62.

The infrared, ultraviolet, $^1H$ and $^{19}F$ n.m.r. spectra agreed with the assigned structure.

EXAMPLE F

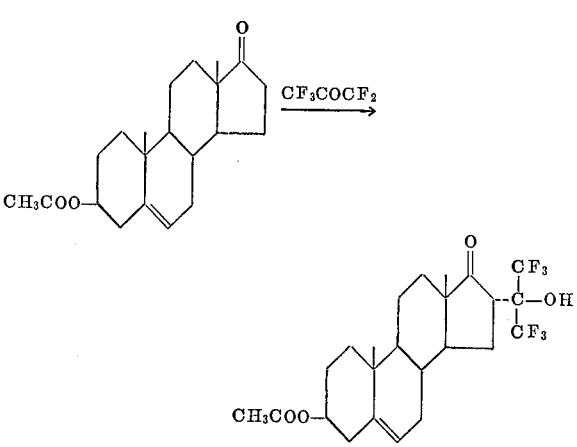

A sealed glass tube containing 11 g. (33 mmoles) of 3β-acetoxy-5-androstene-17-one, 15 ml. (0.14 mole) of hexafluoroacetone and 75 ml. of dry benzene was heated at 150° C. for 24 hours. Since, as determined by the proton n.m.r. spectrum of the solid reaction product, approximately 43% of starting material had remained unchanged, this solid was redissolved in 75 ml. of benzene in a glass tube, another 15-ml. portion of hexafluoroacetone was added and the sealed tube was heated at 100° C. for 11.75 days. The reaction mixture was then taken to dryness under reduced pressure and the residue crystallized from hexane to give 11.385 g. of 3β-acetoxy-16α-

(hexafluoro-2-hydroxyisopropyl)-5-androstene-17-one. An analytical sample obtained by recrystallization from hexane had M.P. 203–204° C. and $[\alpha]_D^{23}$ +13° (c. 0.45, CHCl$_3$).

*Analysis.*—Calcd. for C$_{24}$H$_{30}$F$_6$O$_4$ (percent): C, 58.06; H, 6.09; F, 22.96. Found (percent): C, 57.96; H, 6.19; F, 23.41.

The structure was confirmed by the infrared, ultraviolet, $^1$H and $^{19}$F n.m.r. spectra.

In a similar run using a stainless steel autoclave and a reaction period of 60 hours at 150° C., an 88% yield was obtained of a mixture consisting of 68% of the 16α isomer and 32% of the 16β isomer, as determined from integration of the OH protons in the $^1$H n.m.r. spectrum.

EXAMPLE G

Applying the procedure of Example F to 10 g. of 3β-acetoxy-5α-androstane-17-one with a reaction period of 85 hours at 200° C., there was obtained on crystallization of the reaction product from hexane a first crop, 6.874 g., M.P. 184–186° C., of 3β-acetoxy-16β-(hexafluoro-2-hydroxy-isopropyl)-5α-androstane-17-one, and a second crop, 4.456 g., M.P. 135–152° C., of a mixture of 34% of the 16β isomer and 66% of the 16α isomer. Recrystallization of the first crop from hexane gave the 16β isomer as crystals melting at 189–190° C., $[\alpha]_D^{23}$ +38° (c. 1.35, CHCl$_3$).

*Analysis.*—Calcd. for C$_{24}$H$_{32}$F$_6$O$_4$ (percent): C, 57.82; H, 6.47; F, 22.99. Found (percent): C, 57.95; H, 6.59; F, 22.92.

The structure was confirmed by the infrared, ultraviolet, $^1$H and $^{19}$F n.m.r. spectra.

The 16α isomer can be more readily obtained in the pure state by repeating the above-described procedure except that the reaction mixture is heated at 100° C. for 93 hours. The product is crystallized from hexane (two crops plus some unreacted starting material). Recrystallization of the first crop from hexane affords pure 3β-acetoxy-16α(hexafluoro-2-hydroxyisopropyl) - 5α - androstane-17-one, M.P. 181–184° C., $[\alpha]_D^{24}$ +61° (c. 2.0, CHCl$_3$), further identified by elemental and spectral analyses.

EXAMPLE H

3β-hydroxy-16β-(hexafluoro-2-hydroxyisopropyl) - 5α-androstane-17-one was prepared by refluxing for 5 hours a solution of 6.15 g. of the product of Example F (16α isomer) in 170 ml. of a 1% methanolic potassium hydroxide solution. The reaction mixture was evaporated to dryness and the residue partitioned between water and ethyl acetate. The ethyl acetate solution was washed with water, then with saturated sodium chloride solution and dried over magnesium sulfate. The filtered ethyl acetate solution was taken to dryness under reduced pressure and the residue crystallized from hexane to give 4.380 g. of the 3β-hydroxy compound, M.P. 195–196° C., $[\alpha]_D^{24}$ +57° (c. 1.35, CHCl$_3$).

*Analysis.*—Calcd. for C$_{22}$H$_{30}$F$_6$O$_3$ (percent): C, 57.88; H, 6.63; F, 24.98. Found (percent): C, 57.99; H, 6.45; F, 24.96.

The $^1$H and $^{19}$F n.m.r. spectra showed that this product contained about 27% of the 16α isomer.

EXAMPLE I

The product of Example H was oxidized to 16β-(hexafluoro-2-hydroxyisopropyl)-5α-androstane-3,17-dione by treatment of a 1.5 g. sample in 15 ml. of acetone at 0–5° C. with 1.5 ml. of an 8 N chromium trioxide-sulfuric acid solution over a period of 5 minutes. After stirring for an additional 5 minutes, the reaction mixture was partitioned between ethyl acetate and water and the ethyl acetate solution was worked up as described in Example H. There was obtained 1.39 g. of crude product, M.P. 172–182° C., containing a small amount of the 16α epimer. Recrystallization from hexane afforded 0.884 g. of pure 16β(hexafluoro-2-hydroxy-isopropyl)-5α-androstane - 3,17 - dione, M.P. 194–195° C. An analytical sample from another preparation showed $[\alpha]_D^{24}$ +62° (c. 1.35, CHCl$_3$).

*Analysis.*—Calcd. for C$_{22}$H$_{28}$F$_6$O$_3$ (percent): C, 58.14; H, 6.21; F, 25.08. Found (percent): C, 58.30; H, 6.21; F, 24.77.

The structure was confirmed by the infrared, ultraviolet, $^1$H and $^{19}$F n.m.r. spectra.

EXAMPLE J

The product of Example C was hydrolyzed to the corresponding 17β-hydroxy compound by refluxing a solution of a 2.0 g. sample in 50 ml. of 1% methanolic potassium hydroxide for 3 hours. The reaction mixture was taken to dryness under reduced pressure and the residue partitioned between water and ethyl acetate. The ethyl actate solution was worked up as described in Example G and the product was crystallized from hexane to give, in two crops, a total of 1.5659 g. of 2α-(hexafluoro-2-hydroxyisopropyl) - 17β - hydroxy - 5α - androstane - 3-one. An analytical sample prepared by recrystallizing the first crop from hexane had M.P. 159–160° C. and $[\alpha]_D^{24}$+21° (c. 2.12, CHCl$_3$).

*Analysis.*—Calcd. for C$_{22}$H$_{30}$F$_6$O$_3$ (percent): C, 57.88; H, 6.63; F, 24.98. Found (percent): C, 58.24; H, 6.58; F, 24.98.

The structure was confirmed by the infrared, ultraviolet, $^1$H and $^{19}$F n.m.r. spectra.

EXAMPLE K

The product of Example J was oxidized to the corresponding 17-keto compound by treatment of a 4.24 g. sample in 50 ml. of acetone with 3 ml. of an 8 N chromium trioxide-sulfuric acid solution at 15° C. over a period of 10 minutes. After stirring in the cold for an additional 15 minutes, the reaction mixture was partitioned between water and ethyl acetate. The ethyl acetate solution was washed with water, dried and filtered. Evaporation of the filtrate and crystallization of the residue from hexane gave, in three crops, a total of 3.075 g. of 2α - (hexafluoro - 2 - hydroxyisopropyl)-5α-androstane-3,17-dione. An analytical sample recrystallized from hexane had M.P. 151–151.5° C. and $[\alpha]_D^{24}$+69° (c. 1.54, CHCl$_3$).

*Analysis.*—Calcd. for C$_{22}$H$_{28}$F$_6$O$_3$ (percent): C, 58.14; H, 6.21; F, 25.08. Found (percent): C, 58.50; H, 6.34; F, 24.76.

The infrared, ultraviolet, $^1$H and $^{19}$F n.m.r. spectra confirmed the structure.

The same product can also be obtained directly by reaction of hexafluoroacetone with 5α - androstane-3,17-dione, using the procedure of Example A and taking advantage of the fact that substitution takes place preferentially at ring A under appropriate conditions, so that little or no substitution occurs at ring D. This can be accomplished by using only a stoichiometric amount of hexafluoroacetone (87 hours at 100° C.) or an excess of hexafluoroacetone for a shorter period (17 hours at 100° C.). In both cases, the product obtained after appropriate purification is identical with the 2α-(hexafluoro-2-hydroxyisopropyl)-5α-androstane-3,17-dione of Example K.

EMBODIMENTS OF THE INVENTION

The following examples describe some of the products of this invention and their preparation.

EXAMPLE 1

2-hexafluoroisopropylidene-17β-acetoxy-5α-androstane-3-one

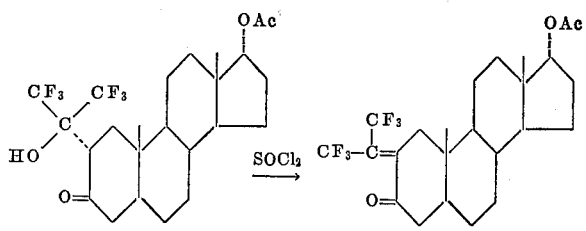

A solution of 5.00 g. (10 mmoles) of 2α-hexafluoro-2-hydroxyisopropyl) - 17β-acetoxy-5α-androstane-3-one (see Example C) in 40 ml. of anhydrous pyridine was cooled to −20° C. and treated with 10 ml. of thionyl chloride over a period of 10 minutes. The solid which separated during the early part of the addition redissolved as the addition progressed to give a yellow solution. This solution was allowed to warm to 25° C. over a period of 18 hours and stirred for 22 hours. The product was then isolated by pouring into water, collecting the precipitate by filtration and washing with water. There was obtained 4.66 g. (96%) of 2 - hexafluoroisopropylidene-17β-acetoxy-5α-androstane-3-one, M.P. 180–184° C. An analytical sample prepared by recrystallization from hexane had M.P. 188–189.5° C. and $[\alpha]_D^{24}$ 19° (c. 1.34, CHCl$_3$).

Analysis.—Calcd. for $C_{24}H_{30}F_6O_3$ (percent): C, 59,63; H, 6.34; F, 23.73. Found (percent): C, 60.00; H, 6.35; F, 23.37.

Ultraviolet:

$$\lambda_{max.}^{EtOH}$$

304 mμ (ε=64).
Infrared: 5.74μ (OAc), 5.82μ (C=O at C-3), 6.02μ

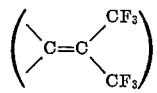

and 7.75–8.75μ (CF stretching vibration).

The proton and F$^{19}$ nuclear magnetic resonance spectra confirmed the structure.

This compound can be hydrolyzed by known methods to 2 - hexafluoroisopropylidene - 17β-hydroxy-5α-androstane-3-one, which can also be obtained by applying the described dehydration procedure to the compound of Example J. Similarly, other steroids of Formula I are obtained by applying the same dehydration procedure to the corresponding starting materials of Formula IV. Examples of such steroids are: 2 - (tetradecafluoro-4-heptylidene)-17β - butyryloxy - 5α - androstane-3-one; 2-(decafluoro-2-pentylidene) - 17β-acetoxy-5α-estrane-3-one; and 2-(tetradecafluoro - 2,4 - dimethyl-3-pentylidene)-17β-hexanoyloxy-5α-androstane-3-one. In these compounds, the formulas of the groups attached to the 2-carbon are, in the order named:

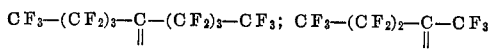
and
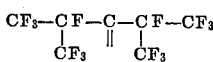

EXAMPLE 2

2-hexafluoroisopropylidene-17β-acetoxy-4-androstene-3-one

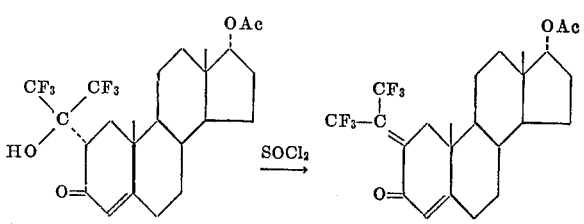

The dehydration of 5.00 g. (10.1 mmoles) of 2α-(hexafluoro - 2 - hydroxyisopropyl)-17β-acetoxy-4-androstene-3-one (see Example D) was carried out as described in Example 1 for the corresponding dihydro derivative. There was obtained 4.51 g. (93%) of 2 - hexafluoroisopropylidene-17β-acetoxy-4-androstene-3-one. An analytical sample prepared by recrystallization from hexane had M.P. 157–158° C. and $[\alpha]_D^{24°}$ 116° (c. 1.28, CHCl$_3$).

Analysis.—Calcd. for $C_{24}H_{28}F_6O_3$ (percent): C, 60.24; H, 5.90; F, 23.83. Found (percent): C, 60.05; H, 5.99; F, 23.47.

Ultraviolet:

$$\lambda_{max.}^{EtOH}$$

261 mμ (ε=9,900) and 350 mμ (ε=60).
Infrared: 5.73μ (OAc), 5.93μ (C=O at C-3), 6.04μ

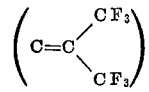

and 6.14μ (C=C).

The proton and F$^{19}$ n.m.r. spectra also confirmed the structure.

The dehydration under similar conditions of 2α-(hexafluoro - 2 - hydroxyisopropyl)-5α-androstane-3,17-dione (see Example K) affords 2 - hexafluoroisopropylidene-5α-androstane-3,17-dione, and the dehydration of 2α-(hexafluoro - 2 - hydroxyisopropyl)-4-androstene-3,17-dione leads to 2-hexafluoroisopropylidene-3,17-dione.

EXAMPLE 3

2-hexafluoroisopropylidene-17β-acetoxy-4-estrene-3-one

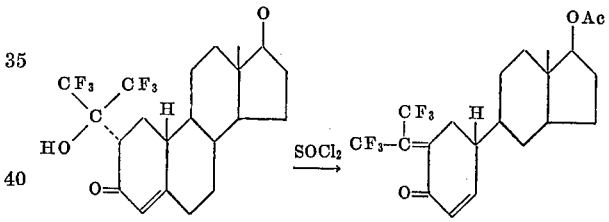

A solution of 3 g. (6.23 mmoles) of 2α-(hexafluoro-2-hydroxyisopropyl) - 17β-acetoxy-4-estrene-3-one (see Example E) in 25 ml. of anhydrous pyridine was cooled to −20° C. and treated with 6 ml. of thionyl chloride over a period of 8 minutes. The reaction mixture was allowed to warm to 25° C. over a period of 30 minutes, stirred for 23 hours and poured into water. The solid which separated was collected by filtration, washed with water and crystallized from hexane to give 2-hexafluoroisopropylidene-17β-acetoxy-4-estrene-3-one in two crops: (1) 1.913 g., M.P. 157–158° C. and (2) 0.25 g., M.P. 158–160° C. for a total of 2.163 g. (65%). Crop 2 having an $[\alpha]_D^{23}$ 67° (c. 1.32, CHCl$_3$) was analyzed.

Analysis.—Calcd. for $C_{23}H_{26}F_6O_3$ (percent): C, 59.47; H, 5.65; F, 24.55. Found (percent): C, 59.92; H, 5.65; F, 24.11.

Infrared: 5.77μ (OAc), 5.98μ (C=O at C-3), 6.10μ

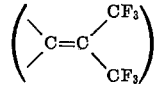

6.23μ, (C=C) and 7.8–8.8μ (CF stretching vibrations).

Other steroids of Formula I are obtained by applying a similar dehydration procedure to the corresponding starting materials of Formula IV. Examples of such steroids are: 2 - (hexadecafluoro - 2 - octylidene)-17β-propionyloxy - 4 - estrene-3-one; 2-(decafluoro-3-pentylidene)-17β-pentanolyoxy - 4-estrene-3-one; and 2-(octafluoro-2-butylidene) - 17β - isobutyryloxy-4-androstene-3-one. In these compounds, the formulas of the groups attached to the 2-carbon are, in the order named:

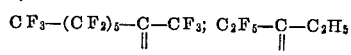

and

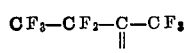

The corresponding saturated steroids (estranes and androstanes) can be similarly prepared. These esters can be hydrolyzed to the corresponding 17β-hydroxy steroids.

EXAMPLE 4

3β-acetoxy-16-hexafluoroisopropylidene-5α-androstene-17-one

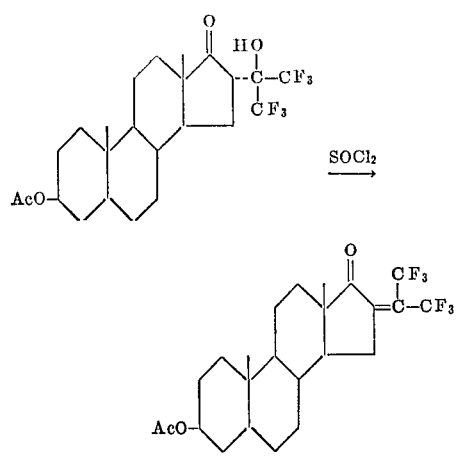

A cooled (—20° C.) solution of 2.00 g. (4.02 mmoles) of 3β-acetoxy-16α-(hexafluoro-2-hydroxyisopropyl) - 5α-androstane-17-one (see Example G) in 16 ml. of anhydrous pyridine was treated with 4 ml. of thionyl chloride over a period of 2 minutes. The reaction mixture was allowed to warm to 25° C. over a period of 1.5 hours and stirred at that temperature for 17 hours. The product was then isolated by pouring the mixture into ice water, collecting the precipitated solid by filtration and washing with water. There was obtained 1.534 g. (80%) of 3β-acetoxy-16 - hexafluoroisopropylidene-5α - androstane-17-one, M.P. 143–145° C. An analytical sample prepared by recrystallization from hexane was obtained as light yellow plates having M.P. 149–150° C. and $[\alpha]_D^{23}$ —45° (c. 0.74, CHCl$_3$).

Analysis.—Calcd. for $C_{24}H_{30}F_6O_3$ (percent): C, 59.99; H, 6.30; F, 23.73. Found (percent): C, 59.83; H, 6.25; F, 23.49.

Ultraviolet:

$\lambda_{max.}^{isooctane}$ 212 mμ (ε=9080) and 365 mμ (ε=65).
Infrared: 5.72μ (C=O at C-17), 5.77μ (OAc), 6.00μ

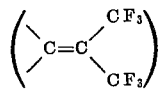

and 7.75–8.75μ (CF stretching vibrations).

The proton and F$^{19}$ n.m.r. spectra were consistent with the assigned structure.

The same procedure, applied to 16β-(hexafluoro-2-hydroxyisopropyl)-5α-androstane-3,17-dione (see Example I) affords 16-hexafluoroisopropylidene - 5α - androstane-3,17-dione. Other products of the invention that can be prepared by the same procedure include, for example, 3β-propionyloxy-16-(docosafluoro-6 - undecylidene) - 5α-androstane-17-one

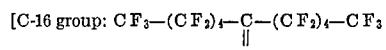

3-hexanoyloxy-16-(hexacosafluoro-7 - tridecylidene) - 4-androstene-17-one

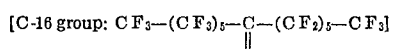

and the corresponding estranes and 4-estrenes. These esters can be hydrolyzed to the corresponding 3β-hydroxy steroids.

EXAMPLE 5

3β-acetoxy-16-hexafluoroisopropylidene-5α-androstane-17-one

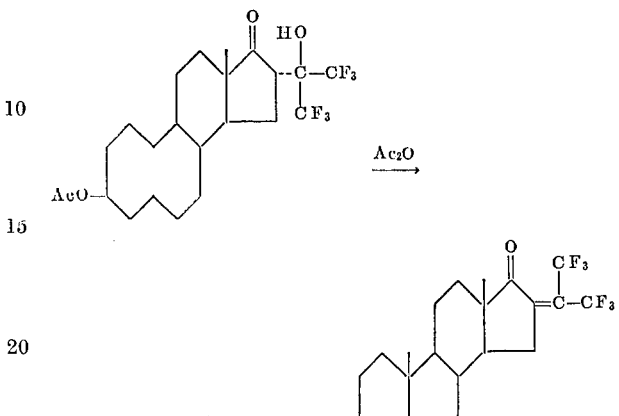

A solution of 0.656 g. (1.31 mmoles) of 3β-acetoxy-16α-hexafluoro-2-hydroxyisopropyl)-5α - androstane - 17-one in 1.3 ml. of pyridine was treated with 4.6 ml. of acetic anhydride and allowed to stand at 25° C. for 48 hours. The reaction mixture was taken to dryness in vacuo and the residue partitioned between ethyl acetate and water. The ethyl acetate layer was washed with water, with a saturated aqueous medium chloride solution and dried over anhydrous magnesium sulfate. The filtered solution was taken to dryness to give 0.570 g. (90%) of crude 3β-acetoxy-16-hexafluoroisopropylidene-5α-androstane-17-one. Recrystallization from hexane gave pale yellow plates, M.P. 150–151° C., which were identical in every respect to the product obtained from the thionyl chloride dehydration described in Example 4.

EXAMPLE 6

3β-acetoxy-16-hexafluoroisopropylidene-5α-androstane-17-one

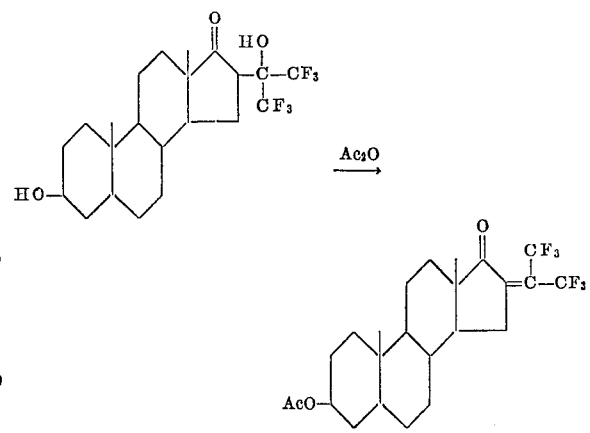

A solution of 1 g. of (2 mmoles) of 3β-hydroxy-16β-(hexafluoro-2-hydroxyisopropyl)-5α-androstane-17-one in 2 ml. of pyridine was treated with 7 ml. of acetic anhydride and allowed to stand at 25° C. for 48 hours. The reaction mixture was taken to dryness in vacuo and the residue partitioned between ethyl acetate and water. The ethyl acetate layer was washed with water, with a saturated aqueous sodium chloride solution and dried over magnesium sulfate. The filtered solution was taken to dryness to give 0.99 g. (94%) of crude 3β-acetoxy-16-hexafluoroisopropylidene-5α-androstane-17-one, identical with the product of Examples 4 and 5.

EXAMPLE 7

3β-acetoxy-16-hexafluoroisopropylidene-5-androstene-17-one

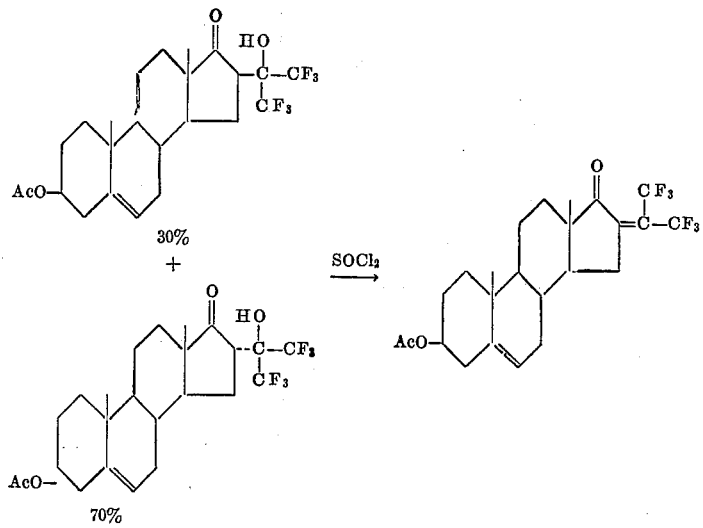

A solution of 14.77 g. (29.8 mmoles) of a 3:7 mixture of the 16β- and 16α-isomers of 3β-acetoxy-16-(hexafluoro-2-hydroxyisopropyl)-5-androstene-17-one (see Example F) in 120 ml. of anhydrous pyridine was cooled to −20° C. and treated with 30 ml. of thionyl chloride over a period of 15 minutes. The reaction mixture was allowed to warm to 25° C. over a period of 30 minutes and stirred for 21 hours. The product was then isolated by pouring the mixture into ice water, collecting the precipitated solid by filtration and washing with water. There was obtained 14.07 g. (98%) of crude 3β-acetoxy-16-hexafluoroisopropylidene-5-androstene-17-one, M.P. 183–187° C. An analytical sample prepared by recrystallization from hexane had M.P. 194–195° C. and $[\alpha]_D^{23}$ −98° (c. 1.38, CHCl₃).

*Analysis.*—Calcd. for $C_{24}H_{28}F_6O_3$ (percent): C, 60.24; H, 5.90; F, 23.83. Found (percent): C, 60.25; H, 5.99; F, 23.56.

Ultraviolet:

$\lambda_{max.}^{isooctane}$ 365 mμ (ε=59).
Infrared: 5.73μ (C=O at C-17), 5.78μ (OAc), 6.05μ

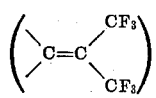

and 7.75–9.00μ (CF stretching vibrations).

The proton and $F^{19}$ n.m.r. spectra confirmed the structure.

Other compounds of the invention are obtained in the same manner from the appropriate starting materials, for example, 3β-acetoxy-16-(decafluoro-3-pentylidene)-5-estrene-17-one or 3β-pentanoyloxy-16-(octafluoro-2-butylidene)-5-androstene-17-one. These esters can be hydrolyzed to the corresponding 3β-hydroxy steroids, which in turn can be oxidized to the corresponding 3-keto steroids.

EXAMPLE 8

2,16-bis(hexafluoroisopropylidene)-5α-androstane-3,17-dione

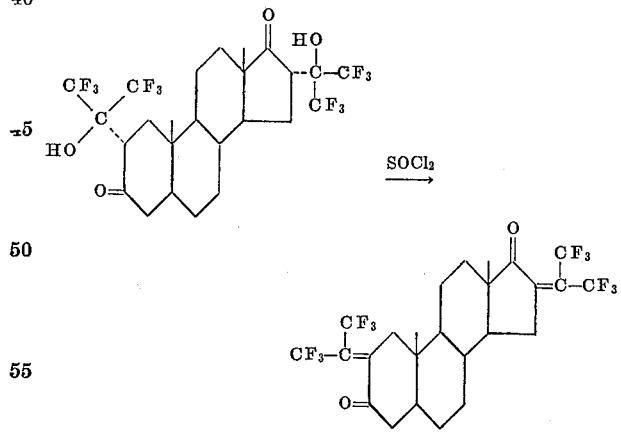

To a cooled (−20° C.) solution of 4.69 g. (7.55 mmoles) of 2α,16α-bis(hexafluoro-2-hydroxyisopropyl)-5α-androstane-3,17-dione (see Example A) in 50 ml. of anhydrous pyridine there was added over a period of 10 minutes 20 ml. of thionyl chloride. The cold bath was allowed to warm to 25° C. the reaction mixture stirred for 18.5 hours and then poured into ice water. The solid product which separated was collected by filtration and washed with water to give 4.294 g. (96%) of 2,16-bis (hexafluoroisopropylidene)-5α-androstane-3,17-dione, M.P. 207–208° C. An analytical sample prepared by recrystallization from hexane had M.P. 213–214° C. and $[\alpha]_D^{24}$ −23° (c. 0.62, CHCl₃).

*Analysis.*—Calcd. for $C_{25}H_{24}F_{12}O_2$ (percent): C, 51.37; H, 4.14; F, 39.00. Found (percent): C, 51.31; H, 4.35; F, 39.02.

Ultraviolet:

$\lambda_{max.}^{EtOH}$ 212 mμ (ε=21,200), 308 mμ (ε=70) and 363 mμ (ε=71).

Infrared:

5.72μ (C=O at C-17), 5.83μ (C=O at C-3), 6.05μ

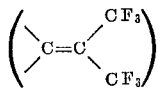

and 7.75–8.75μ (CF stretching vibrations).

The proton and F$^{19}$ n.m.r. spectra also supported the structure.

Other 2,16-bis[di(perfluoroalkyl)methylene] steroids of the invention are prepared in the same manner from the appropriate starting materials. For example, the starting material of Example B leads to 2,16-bis(hexafluoroisopropylidene)-4-androstene-3,17-dione, and the corresponding 4-estrene compound leads to 2,16-bis(hexafluoroisopropylidene)-4-estrene-3,17-dione. The 2,16-bis[di(perfluoroalkyl)methylene]5α-estrane- (or 5-estrene- or 5-androstene-) 3,17-diones can also be obtained by similarly dehydrating the appropriate starting materials.

The bis(perfluoroalkyl)methylene steroids of this invention possess useful therapeutic properties. They affect the secretion of the gonadotrophins and thus regulate the reproductive cycle. In particular, they control ovulation, endometrial and placental development. Furthermore, these compounds find use in the treatment of various disorders brought on by excessive secretion of gonadotrophin. They are particularly valuable in that, while being antigonadotrophic, they are devoid of androgenic or estrogenic properties. In fact, they are actually antiandrogenic, being able to inhibit the effect of endogenous androgen.

As is known, androgenic inhibitory steroids are valuable agents in the therapeutic treatment of prostatic carcinoma (see, for example, the article by Huggins in Cancer Research, 16, 825, 1956), and have been proposed in treatment of other disorders such as postpuberal and idiopathic hirsutism in women, the Stein-Leventhal syndrome and adolescent and premenstrual acne. (See, for example, Saunders, et al., Steroids, 3, 687 [1964], listing references.)

Compounds having pituitary inhibitory activity (antigonadotrophic activity) find aplication in the treatment of menopause syndromes and in antifertility drugs.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows.

I claim:
1. A steroid selected from the group consisting of

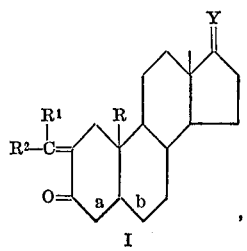

I

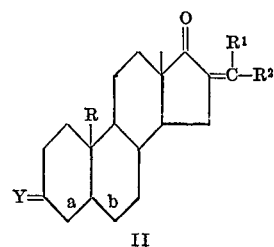

II and

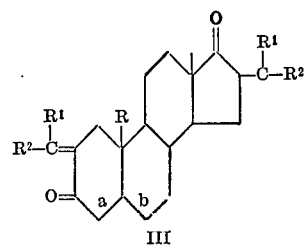

III wherein

R is methyl or hydrogen;
R$^1$ and R$^2$ are alike or different and are perfluoroalkyl groups of up to 6 carbon atoms;
Y is =O,

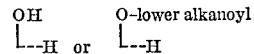

containing up to 8 carbon atoms; and
a and b between carbons 4 and 5 and 5 and 6 respectively, each is a single or a double bond with the proviso that when either is a double bond the other is a single bond.

2. A steroid of claim 1 selected from the group consisting of

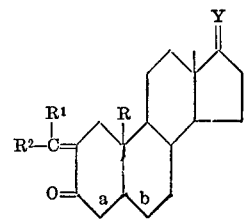

and

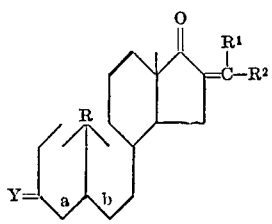

wherein, R, R$^1$, R$^2$, Y, a and b are as defined in claim 1.

3. A steroid of claim 1 selected from the group consisting of

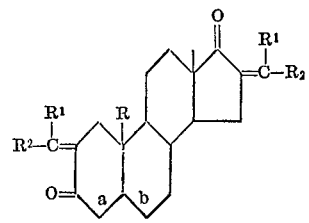

wherein R, R$^1$, R$^2$, a and b are as defined in claim 1.

4. The steroid I of claim 1 wherein R is methyl, R$^1$ and R$^2$ are trifluoromethyl, Y is

and a and b are single bonds, said compound being 2-hexafluoroisopropylidene - 17β - acetoxy - 5α - androstane-3-one.

5. The steroid I of claim 1 wherein R is methyl, R$^1$ and R$^2$ are trifluoromethyl, Y is

and a is a double bond, said compound being 2-hexafluoroisopropylidene-17β-acetoxy-4-androstene-3-one.

6. The steroid II of claim 1 wherein R is methyl, $R^1$ and $R^2$ is trifluoromethyl, Y is

and a and b are single bonds, said compound being 3β-acetoxy - 16 - hexafluoroisopropylidene - 5α - androstane-17-one.

7. The steroid I of claim 1 wherein R is hydrogen, $R^1$ and $R^2$ are trifluoromethyl, Y is

and a is a double bond, said compound being 2-hexafluoroisopropylidene-17β-acetoxy-4-estrene-3-one.

8. The steroid II of claim 1 wherein R is methyl, $R^1$ and $R^2$ is trifluoromethyl, Y is

b is a double bond, said compound being 3β-acetoxy-16-hexafluoroisopropylidene-5-androstene-17-one.

9. The steroid III of claim 1 wherein R is methyl, $R^1$ and $R^2$ are trifluoromethyl and a and b are single bonds, said compound being 2,16-bis(hexafluoroisopropylidene)-5α-androstane-3,17-dione.

No references cited.

ELBERT L. ROBERTS, *Primary Examiner.*

U.S. Cl. X.R.

260—397.4